July 7, 1964
W. H. GIEDT
3,139,752
DUAL THERMOELEMENT SYSTEM FOR MEASURING RAPIDLY CHANGING
FLUID TEMPERATURES AND THERMO-ELEMENTS THEREFOR
Filed March 16, 1959
3 Sheets-Sheet 1
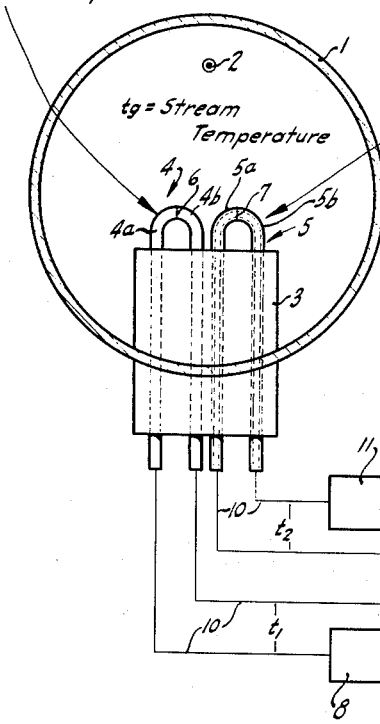
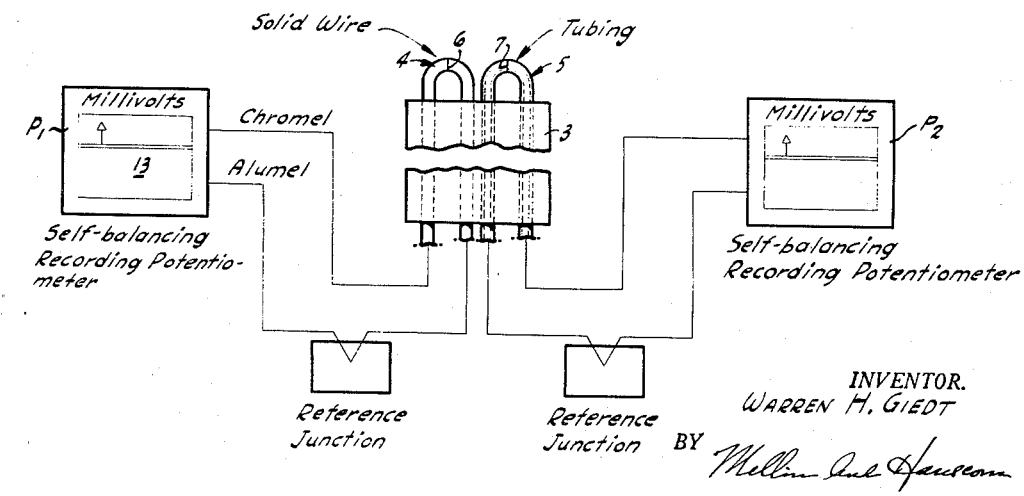
INVENTOR.
WARREN H. GIEDT
BY
ATTORNEYS

INVENTOR.
WARREN H. GIEDT

BY Mellin and Hanscom

ATTORNEYS

United States Patent Office 3,139,752
Patented July 7, 1964

3,139,752
DUAL THERMOELEMENT SYSTEM FOR MEASURING RAPIDLY CHANGING FLUID TEMPERATURES AND THERMO-ELEMENTS THEREFOR
Warren H. Giedt, San Francisco, Calif., assignor to American Radiator & Standard Sanitary Corporation, New York, N.Y., a corporation of Delaware
Filed Mar. 16, 1959, Ser. No. 799,719
2 Claims. (Cl. 73—359)

This invention relates to and in general has for its object the provision of an instantaneously responsive thermo-element system for measuring a rapidly varying fluid temperature, and to thermoelement probes, such as thermocouple probes, resistance element probes, thermistor probes and vapor-filled bulbs for use in connection with such a system.

The performance of jet and rocket engines is a function of the temperatures generated in the gas streams flowing through and leaving the systems. Measurement of these temperatures is essential, not only for the evaluation of engine performance, but also for assuring a safe operating environment for the engine components. The latter, for example, is a necessary consideration in the design of fuel control systems.

The high velocities, high temperatures, and rapidly changing conditions in such gas streams make the temperature-measurement problem an extremely difficult and complex one. Consequently, extensive effort has been devoted to the design and development of equipment for this application. Results to date, however, are admittedly inadequate, particularly in regard to response rate under rapidly changing conditions and in the very high temperature regime.

This invention is also applicable in the field of nuclear reactors. It is possible in homogeneous reactors (i.e., where the fissionable material is uniformly dispersed throughout a liquid medium) to cause essentially step changes in temperature by sudden changes in the position of the control rods. Immediate measurement of the resulting temperature changes is necessary for both experimental study of performance and for control purposes. It should be noted that the fluid in such a case might be quiescent or flowing.

The procedure most commonly employed for determining the temperature of a fluid (stationary or flowing) is to measure the magnitude of some temperature-dependent property of an object immersed in the fluid. The quantity measured may be the length or volume, the electrical resistance, or generated thermoelectromotive force. The actual specification of temperature involves calibration of the measured quantity in terms of a specified temperature scale. Inherent in this procedure is the requirement that the sensing device be in the fluid long enough to assume the fluid temperature. When the latter changes, some time will elapse before the sensing element attains the new temperature and provides the desired indication.

For purposes of comparing the abilities of different elements to follow rapidly changing fluid temperatures, a quantity known as the time constant $\tau$ is defined. As ordinarily used, this is simply the time required for an element to undergo 63% of an instantaneous (step) change in the fluid temperature. $\tau$ is clearly determined by the thermal capacity of the sensing element and the freedom with which heat is transferred to it. Specifically, the lower the product of the specific heat and the weight of the element, and the higher the product of the area and the coefficent of heat transfer (sometimes called the unit thermal conductance) between the fluid and the element, the smaller $\tau$ will be.

In many instances, however, particularly in the field of reaction propulsion, even when $\tau$ is made as small as possible (through use of a very small-diameter thermocouple, for example), either fluid-stream temperature changes are not sensed rapidly enough, or it is desirable to improve this sensing ability in order to improve system performance.

More specifically, one of the objects of this invention is the provision of a dual thermoelement device for determining the instantaneous temperature of a fluid (stationary or flowing) wherein first and second thermo-elements such as thermocouple elements, resistance elements, thermistors and fluid-filled bulbs, are located in said fluid, such that the total thermal conductances of said elements are equal, and wherein the thermal capacities of said thermo-elements are unequal.

A second object of this invention is the provision of a dual thermoelement system for determining the instantaneous temperature of a fluid wherein first and second thermo-elements such as thermocouple elements, resistance elements, thermistors and fluid-filled bulbs are symmetrically located in said fluid for identical action thereby, wherein the total thermal conductances of said elements are equal, wherein the thermal capacities of said elements are unequal, and wherein said elements are connected to a computer capable of instantaneously solving the equation $$t_g = \frac{t_1 - t_2 K_a \frac{t'_1}{t'_2}}{1 - K_a \frac{t'_1}{t'_2}}$$

wherein $t_g$=fluid temperature varying in general with time T
$t_1$=instantaneous temperature indicated by the first sensing element
$t_2$=instantaneous temperature indicated by the second senseing element $$t'_1 = \frac{dt_1}{dT}$$

$$t'_2 = \frac{dt_2}{dT}$$

and $$K_a = \frac{W_1}{W_2}$$

where $W_1$=weight of the first sensing element, and
$W_2$=weight of the second sensing element.

Present computing machines can be used to perform the calculations required in the above equation. Design of a special device for this purpose can also be carried out following established procedures.

Another object of this invention is the provision of a system of the character above described wherein the outputs of said thermal elements representing their instantaneous temperatures, are transmitted to a computer capable of solving the equation $$t_g = \frac{t_1 - t_2 K_b \frac{t'_1}{t'_2}}{1 - K_b \frac{t'_1}{t'_2}}$$

wherein $t_g$=fluid temperature varying in general with time T
$t_1$=instantaneous temperature indicated by the first sensing element $t_2$ = instantaneous temperature indicated by the second sensing element $$t'_1 = \frac{dt_1}{dT}$$

$$t'_2 = \frac{dt_2}{dT}$$

$$K_b = \frac{\text{the thermal capacity of the first probe}}{\text{the thermal capacity of the second probe}} = \frac{W_1 c_1}{W_2 c_2}$$

wherein:

$c_1$ = specific heat of the first sensing element
$c_2$ = specific heat of the second sensing element Another object of this invention is the provision of a dual thermoelement system for determining the instantaneous temperature of a fluid wherein the first and second thermo-elements are located in fluid such that the unit thermal conductances of said elements are equal and wherein the ratio of the exposed area of the first to its thermal capacity and the ratio of the area of the second to its thermal capacity are unequal, and wherein said elements are connected to a computer capable of instantaneously solving the equation $$t_g = \frac{t_1 - t_2 K_c \frac{t'_1}{t'_2}}{1 - K_c \frac{t'_1}{t'_2}}$$

$t_g$ = fluid temperature varying in general with time T
$t_1$ = instantaneous temperature indicated by the first sensing element
$t_2$ = instantaneous temperature indicated by the second sensing element $$t'_1 = \frac{dt_1}{dT}$$

$$t'_2 = \frac{dt_2}{dT}$$

$$K_c = \frac{(A_1/W_1 c_1)}{(A_2/W_2 c_2)}$$

The invention possesses other advantageous features, some of which with the foregoing, will be set forth at length in the following description where those forms of the invention which have been selected for illustration in the drawings accompanying and forming a part of the present specification, are outlined in full. In said drawings, several forms of the invention are shown, but it is to be understood that it is not limited to such forms, since the invention as set forth in the claims may be embodied in other forms.

Referring to the drawings:

FIG. 1 is a schematic diagram illustrating a system embodying the objects of our invention and including a computer for solving for $t_g$.

FIG. 2 is a diagram similar to the diagram of FIG. 1, but wherein each of the thermoelement probes are shown connected through a reference junction with a recording potentiometer in standard fashion rather than being associated with a computer.

Figure 3:
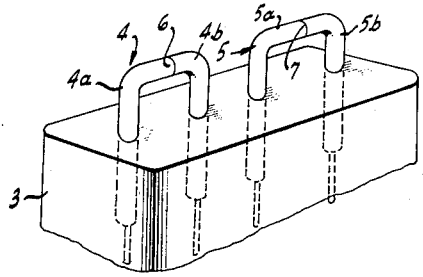
FIG. 3 is an enlarged fragmentary perspective view of the first and second thermocouple elements and their ceramic holder included in FIGS. 1 and 2.

For a given thermocouple in a fluid (stationary or flowing; either of the two shown in FIG. 1), the differential equation describing the thermocouple response is (1) $\qquad hA(t_g - t) = Wct'$ where:

$h$ = heat transfer coefficient (unit thermal conductance) between the fluid and the thermocouple
$A$ = exposed area of the thermocouple through which heat transfer occurs
$t_g$ = fluid temperature, which in general varies with time T
$t$ = instantaneous temperature of the thermocouple
$W$ = weight of the thermocouple
$c$ = specific heat of the thermocouple
$t' = dt/dT$ = rate of change of the thermocouple temperature Equation 1 can be rearranged to (2) $\qquad \frac{Wc}{hA} t' + t = t_g$, or $\tau t' + t = t_g$ where $$\tau = \frac{Wc}{hA} = \text{thermocouple time constant}$$

The principle of the so-called derivative-response compensation systems is clearly illustrated by the above equation. A circuit is employed that measures $t'$, multiplies it by $\tau$, and adds to the product to $t$ to give the instantaneous fluid stream temperature $t_g$. It should be noted, however, that since $\tau$ varies with stream flow conditions (the flow determines $h$), these systems require adjustment for a change in flow conditions.

The present invention incorporates a dual sensing element and associated equipment compensating for time lag and which is independent of flow conditions.

As illustrated in FIG. 1, such a system includes a conduit 1 serving to cause a fluid stream 2 (the instantaneous temperature $t_g$ of which is to be determined) to flow in a predetermined path. Mounted on the conduit 1 and extending thereinto is a ceramic mounting block 3, and mounted in the block 3 are first and second thermocouple elements or probes respectively indicated by the reference numerals 4 and 5. Essential to this modification of my invention is the condition that the two thermocouple elements be symmetrically disposed within the path of the fluid stream so that the action of the fluid stream on the two probes will be identical. Although as illustrated in FIG. 1, the two probes are located in a plane transverse to the direction of flow of the fluid stream, this is not essential, it being merely necessary that the probes be symmetrically located in the fluid stream.

The thermocouple element 4 consists of legs 4a and 4b protruding from the mounting block 3 and joined at their upper ends to form a hot junction 6. The legs 4a and 4b can be made of solid wire of dissimilar metals such as, for example, chromel and Alumel, and of identical diameters. Likewise, the probe 5 includes two legs 5a and 5b made of dissimilar metals such as chromel and Alumel, and joined to form a hot junction 7. A second essential condition of this modification of my invention to be here particularly noted is that although the surface area A of the probe 5 should be identical to the surface area of the probe 4, the thermal capacities of the two probes 4 and 5 must be unequal. To this end, the two legs 5a and 5b of the probe 5 are made of metal tubes having an outer diameter equal to the diameter of the probe 4 and being otherwise identical to the legs of the probe 4.

As a result of this structure, the two probes present identical surfaces to the fluid stream, but the thermal capacities of the two probes are unequal.

Also, as illustrated in FIG. 1, the probe 4 is connected through leads 10 and a reference thermocouple junction 8 with a computer 9. Likewise, the probe 5 is connected through leads 10 and a reference thermocouple junction 11 with the computer 9. Although for purposes of illustration the reference thermocouple junctions have been indicated as external to the computer 9, as a practical matter these elements are built into the computer. As a result of this system, the E.M.F. records of the two probes 4 and 5 reflecting their instantaneous temperatures $t_1$ and $t_2$, are fed into the computer 9 for solving the equation $t_g$ (the instantaneous temperature in the fluid stream)

$$(3) \quad \frac{t_1 - t_2 K_b \frac{t'_1}{t'_2}}{1 - K_b \frac{t'_1}{t'_2}} = t$$

Computers for solving this equation are readily available and hardly require further discussion here.

Now concerning the derivation of the above formula.

As previously set forth, the time constant $\tau$ of a thermocouple $$= \frac{Wc}{hA}$$

Since the thermal capacity of the air in the tubing of the probe 5 is negligible, and since the area exposed to heating is the same for both of the probes 4 and 5, the time constants of the two will be proportional to their weights, which can be specified or determined. Thus, $$\tau_1 = \frac{W_1 c}{hA} \text{ (time constant for thermocouple 4)}$$

$$\tau_2 = \frac{W_2 c}{hA} \text{ (time constant for thermocouple 5)}$$

The response of the two thermocouples is given by the following two equations:

$$(4) \quad \frac{K_1}{h} t'_1 + t_1 = t_g$$

where $$K_1 = \frac{W_1 c}{A}$$

and $$(5) \quad \frac{K_2}{h} t'_2 + t_2 = t_g$$

where $$K_2 = \frac{W_2 c}{A}$$

Solving Equation 5 for $h$ yields $$(6) \quad h = \frac{K_2 t'_2}{t_g - t_2}$$

Substituting this value of $h$ in Equation 4, and solving for $t_g$ gives $$(7) \quad t_g = \frac{t_1 - \frac{K_1 t'_1}{K_2 t'_2} t_2}{1 - \frac{K_1 t'_1}{K_2 t'_2}}$$

or letting $K_b = K_1/K_2 = W_1/W_2$, $$(8) \quad t_g = \frac{t_1 - t_2 K_b \frac{t'_1}{t'_2}}{1 - K_b \frac{t'_1}{t'_2}}$$

This last equation gives the stream temperature $t_g$ as a function of the outputs of the two thermocouples, $t_1$ and $t_2$ and their first time derivatives $t'_1$ and $t'_2$. It should be observed that the requirements for a probe which will satisfy the conditions of the last above-mentioned equation are that the product $hA$ is the same for each thermocouple and that the product of $Wc$ is different but known for each. The system shown in FIG. 1 is one means of satisfying this. Other probe designs such as the ones shown in FIGS. 3, 4, 5, 6, and 7 will be presently described.

Here it should also be observed that an additional modification of the invention is a probe with two thermo-elements wherein the heat transfer coefficients (unit thermal conductance) of the two thermo-elements are equal and wherein the ratio of the exposed area of the first $A_1$ to its thermal capacity $W_1 c_1$ and ratio of the area of the second $A_2$ to its thermal capacity are unequal, i.e., $$A_1/W_1 c_1 = A_2/W_2 c_2$$

The operations involved in the right side of the last equation are straightforward and can be performed with standard electronic components since the probe outputs are voltages. The entire system will thus consist of a two thermocouple probe and an electronic circuit to perform the computation indicated in the above-mentioned last equation, to give an output equivalent to the instantaneous gas temperature $t_g$ as shown schematically in FIG. 1.

In FIG. 2 a system has been shown wherein the outputs of the probes 4 and 5 are fed respectively into self-balancing recording potentiometers $p_1$ and $p_2$, and wherein the temperatures $t_1$ and $t_2$ of the two thermocouples 4 and 5, or rather the voltages corresponding thereto, are readable on a millivolt scale 13 forming a part of the potentiometer. Otherwise, the various elements of this system are identical with the system of FIG. 1 and have been designated accordingly.

The systems illustrated in FIGS. 1 and 2 are merely special cases of my invention wherein the surface areas of the two probes are made equal, wherein the two probes are symmetrically disposed in the fluid stream and wherein the two probes are made of the same materials and configuration and therefore have identical heat transfer coefficients $h$.

If the probes are not symmetrically disposed in the fluid stream, but their orientation is known, the action of the fluid stream on one probe will differ from its action on the other probe merely by a constant which can be calculated. Similarly, if the external exposed surfaces of the two probes are unequal, but known, the resulting difference in the E.M.F. produced by this discrepancy can be compensated for by a constant. In its more general form, the relationship which must exist between the probes is that the total surface conductance $h_1 A_1$ of one probe be equal to $Ch_2 A_2$, the total surface conductance of the other.

However, the necessity of dealing with the constant C can be obviated by the simple expedient of using two probes having equal surface areas, symmetrically disposed in the fluid stream and made of the same materials, all as illustrated in FIGS. 1, 2, and 3.

Although the probes illustrated in FIGS. 1, 2, and 3 are in the form of thermocouples, this is not necessary, for, as already suggested, such probes or thermo-elements can take the form of resistors, thermistors, and fluid-filled bulbs, so long as each pair of probes is symmetrically located in the fluid stream, their surface areas being equal, and their thermal capacities being unequal.

Figure 4:
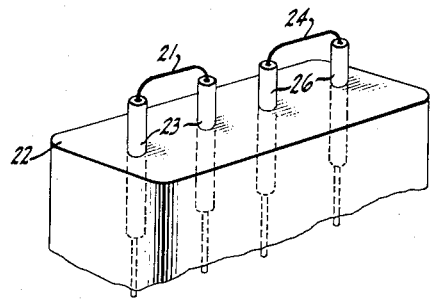
FIG. 4 is a view similar to FIG. 3 but wherein resistance elements have been substituted for the thermocouple elements.

As illustrated in FIG. 4, the two probes of my system can take the form of a first resistance wire 21 of one material mounted in a ceramic supporting block 22 through ceramic tubes 23 and a second resistance wire 24 of a different thermal capacity than the wire 21 but having an identically exposed surface area. In other words, the conditions imposed on the wires 21 and 24 are identical to the conditions imposed on the thermocouples 4 and 5 as previously described.

Figure 8:
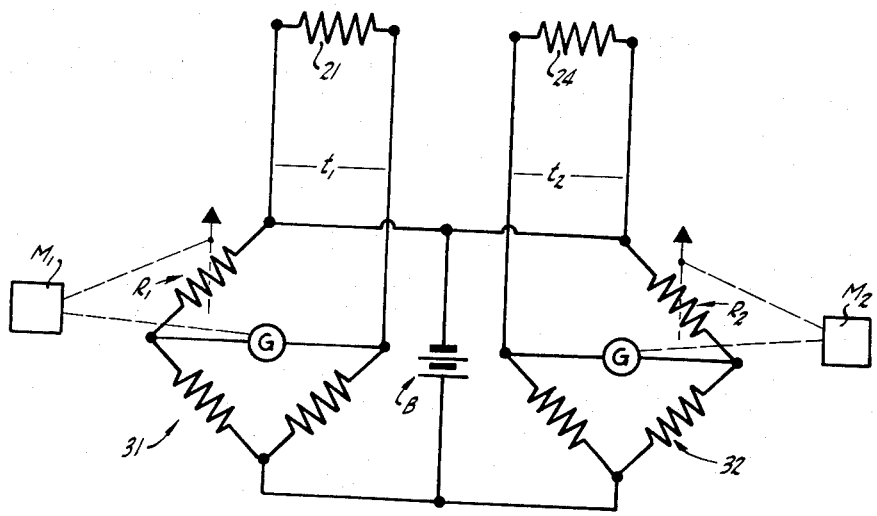
FIG. 8 is a wiring diagram for use in conjunction with a resistance type of thermoelement probe.

As diagrammatically illustrated in FIG. 8, the resistances 21 and 24 are respectively included as one leg of bridges 31 and 32. The bridge 31 includes a galvanometer $G_1$ and a variable resistance $R_1$. Likewise, the bridge 32 includes a galvanometer $G_2$ and a variable resistance $R_2$. Connected between the two bridges is a battery B. The resistance of each of the probe resistances 21 and 24 will vary with the temperature to which it is subjected and this will result in a voltage variation across the bridge associated therewith as reflected by the galvanometer. Each bridge is maintained in balance by adjusting its variable resistance $R_1$ or $R_2$ as the case may be. However, since the response of a human being is not sufficiently fast to permit the bridges to be maintained in balance by manual operation of the variable resistances $R_1$ and $R_2$, resort is had to a servo system wherein a servo motor $M_1$ is made responsive to variations in galvanometer $G_1$, through a suitable electronic circuit and wherein the variable resistance is controlled by the motor $M_1$. Similarly, the bridge 32 is associated with a servo motor $M_2$ for actuating the variable resistance $R_2$ is response to variations in the galvanometer $G_2$. Since well-known equipment can be used for this purpose, a further explanation of its construction and operation is deemed unnecessary.

Variable resistances $R_1$ and $R_2$ reflect the instantaneous temperatures of the probes 21 and 24, and as in the case of the system illustrated in FIG. 1, these parameters can be delivered to a suitable computer for solving for $t_g$ in accordance with that last-named equation as above set forth.

Figure 5:
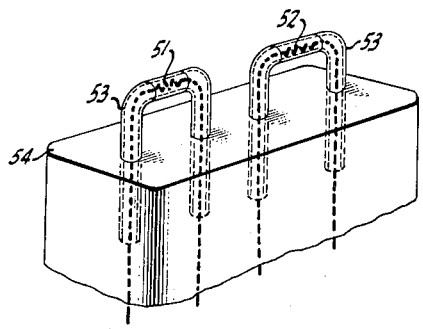
FIG. 5 is a view similar to FIG. 4 but wherein the resistance elements are encased in ceramic tubing.
Figure 9:
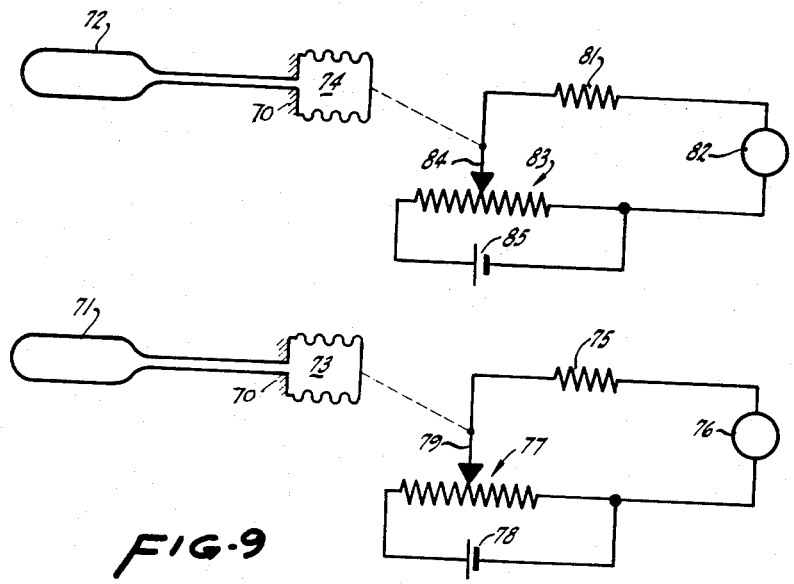
FIG. 9 is a diagram of a sensing system in which fluid-filled bulbs are used as thermo-elements instead of thermocouples or resistances.

For the resistance probe elements 21 and 24 illustrated in FIG. 9, thermistors such as illustrated in FIG. 5 can be used, for broadly speaking, a thermistor is nothing more than a thermally sensitive resistor having a negative temperature coefficient.

Figure 6:
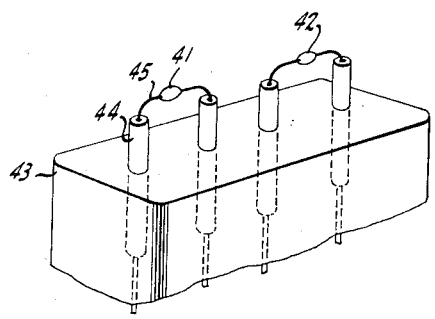
FIG. 6 is another view similar to FIG. 3 but wherein thermistor elements have been substituted for the thermocouple elements.

As illustrated in FIG. 6, thermistors 41 and 42 are mounted on a ceramic supporting block 43 through the agency of ceramic tubes 44 and leads 45. Preferably, the thermistors 41 and 42 should be made of different materials, but be of the same size and shape, and as in the case of all probes for this purpose, their thermal capacities should be unequal.

As illustrated in FIG. 6, the probes take the form of thermally sensitive resistors 51 and 52 encased in protective ceramic tubing 53 extending into or through the ceramic supporting block 54.

Here again for the sake of simplicity the resistors and their protecting tubing should preferably be of identical size and shape and the thermal capacities of the two probes should be unequal.

Figure 7:
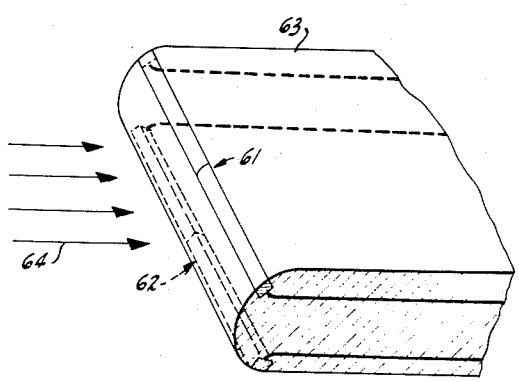
FIG. 7 is a diagrammatic illustration of an alternative form of a two-thermocouple probe.

FIG. 7 is merely illustrative of a modified form of thermocouple probe system wherein two thermocouple elements 61 and 62 are symmetrically embedded in a ceramic supporting block 63 and symmetrically presented to the fluid stream 64. Here it should be particularly noted that although the exposed areas of the two probe elements are equal, the thickness of the probe element 62 is greater than the thickness of the probe element 61 so as to satisfy the condition that thermal capacities of the two probes be unequal.

Still another type of probe which can be used as an alternative to thermocouples is a fluid-filled bulb such as is illustrated in FIG. 9. As there shown, a pair of liquid-filled bulbs 71 and 72 having identical surface areas but unequal thermal capacities are symmetrically mounted in a ceramic supporting block 70 for symmetrical disposition in a fluid stream. As illustrated in FIG. 9, the bulbs 71 and 72 communicate respectively with sylphons 73 and 74 and which operate in response to variations in the temperatures of the fluid within the bulbs 71 and 72. Associated with the sylphon 73 is a closed circuit including a resistor 75, an ammeter 76, and a variable resistor 77. Shunted around the resistor 77 is a battery 78. The movement of the variable resistor operator 79 is made responsive to the movement of the sylphon 73.

Similarly, the sylphon 74 is associated with a closed circuit including a resistor 81, an ammeter 82, and a variable resistor 83 including an operator 84. Shunted around the resistor 83 is a battery 85.

The pressures in the bulbs 71 and 72 are functions of the temperatures of the bulbs. Variations in such pressures is manifested by a corresponding movement of the sylphons associated with the bulbs. And the motion of each sylphon is used to vary the voltage in its associated circuit and in which its ammeter shows a current proportional to the position of its associated sylphon. These currents are then related to the instantaneous temperatures of the bulbs 71 and 72 and can be fed into a computer for solving for $t_g$ the instantaneous temperature of the fluid or jet stream.

I claim:

1. A temperature sensing system for determining the instantaneous temperature $t_g$ of a fluid stream comprising: first and second temperature sensing elements symmetrically disposed within said fluid stream for identical action thereby, the total thermal conductances of said sensing elements being equal and their thermal capacities being unequal; and a computer connected with said first and second sensing elements for calculating said instantaneous temperature $t_g$ in accordance with the formula:

$$t_g = \frac{t_1 - t_2 K \frac{t'_1}{t'_2}}{1 - K \frac{t'_1}{t'_2}}$$

$t_g$=fluid stream temperature varying in general with time T $t_1$=instantaneous temperature indicated by the first sensing element $t_2$=instantaneous temperature indicated by the second sensing element $$t'_1 = \frac{dt_1}{dT}$$

$$t'_2 = \frac{dt_2}{dT}$$

$$K = \frac{K_1}{K_2}$$

where $K_1$=the thermal capacity of the first sensing element,
$K_2$=the thermal capacity of the second sensing element.

2. A temperature sensing system for determining the instantaneous temperature $t_g$ of a fluid comprising: first and second thermal elements having unequal thermal capacities, and so disposed in said fluid that the total surface heat transfer conductances of said elements are equal; the output of said thermal elements being connected with a computer for calculating said instantaneous temperature $t_g$ in accordance with the formula:

$$t_g = \frac{t_1 - t_2 K \frac{t'_1}{t'_2}}{1 - K \frac{t'_1}{t'_2}}$$

wherein $t_g$=fluid stream temperature varying in general with time T $t_1$=instantaneous temperature indicated by the first sensing element $t_2$=instantaneous temperature indicated by the second sensing element $$t'_1 = \frac{dt_1}{dT}$$

$$t'_2 = \frac{dt_2}{dT}$$

and $$K = \frac{K_1}{K_2}$$

where $K_1$ = thermal capacity of the first sensing element, and
$K_2$ = thermal capacity of the second sensing element.

References Cited in the file of this patent

UNITED STATES PATENTS

| | | |
|---|---|---|
| 880,272 | Bristol | Feb. 25, 1908 |
| 1,659,804 | Brown | Feb. 21, 1928 |
| 1,994,757 | De Florez et al. | Mar. 19, 1935 |
| 2,054,120 | De Florez et al. | Sept. 15, 1936 |
| 2,221,633 | Dasher | Nov. 12, 1940 |
| 2,268,469 | Barnhart | Dec. 30, 1941 |
| 2,477,835 | Smith | Aug. 2, 1949 |
| 2,660,883 | Wyczalek | Dec. 1, 1953 |
| 2,696,120 | Underwood | Dec. 7, 1954 |

OTHER REFERENCES

Starks and Rudolph, "Basic Applications of Analog Computors," Instruments and Automation, March 1956, vol. 29, pp. 464–469.

Moffat, "How to Specify Thermocouple Response," ISA Journal, June 1957, pp. 219–223.

Atkins and Setterington, "Thermistors—A Survey of Their Application in Temperature Measurement and Control," Instrument Practice, October 1959, vol. 13, No. 10.